US010051040B2

(12) United States Patent
Marvin et al.

(10) Patent No.: US 10,051,040 B2
(45) Date of Patent: Aug. 14, 2018

(54) ELEVATOR SYSTEM USING DUAL COMMUNICATION CHANNELS

(75) Inventors: Daryl J. Marvin, Farmington, CT (US); Vijay Jayachandran, West Hartford, CT (US); Bruce P. Lerner, Cheshire, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 965 days.

(21) Appl. No.: 14/390,214

(22) PCT Filed: Apr. 3, 2012

(86) PCT No.: PCT/US2012/031928
§ 371 (c)(1),
(2), (4) Date: Oct. 2, 2014

(87) PCT Pub. No.: WO2013/151533
PCT Pub. Date: Oct. 10, 2013

(65) Prior Publication Data
US 2015/0127697 A1    May 7, 2015

(51) Int. Cl.
*B66B 1/28* (2006.01)
*H04L 29/08* (2006.01)
(Continued)

(52) U.S. Cl.
CPC ............ *H04L 67/10* (2013.01); *B66B 1/3446* (2013.01); *H04W 4/80* (2018.02)

(58) Field of Classification Search
CPC ....... H04L 67/10; B66B 1/3446; H04W 4/008
(Continued)

(56) References Cited

U.S. PATENT DOCUMENTS 4,709,788 A * 12/1987 Harada ..................... B66B 1/18
187/382
4,762,204 A * 8/1988 Blain ....................... B66B 1/18
187/247
(Continued)

FOREIGN PATENT DOCUMENTS

CN    1208390 A    2/1999
EP    0239662 A1   10/1987
(Continued)

OTHER PUBLICATIONS

Chinese Fourth Office Action for application CN 201280072250.5, dated Mar. 17, 2017, 12pgs.
(Continued)

*Primary Examiner* — Anthony Salata
(74) *Attorney, Agent, or Firm* — Cantor Colburn LLP

(57) ABSTRACT

An elevator control system includes at least one destination entry fixture coupled to a controller area network (CAN) bus that provides a first communication channel, the at least one destination entry fixture operable to transmit destination information over the CAN bus; a plurality of elevator car controllers each associated with a respective elevator car, the plurality of elevator car controllers coupled to the CAN bus to receive the destination information; the plurality of elevator car controllers coupled to a ring network that provides a second communication channel; and a group controller operable to determine an elevator car to be dispatched in response to receiving the destination information.

16 Claims, 2 Drawing Sheets

(51) Int. Cl.
  *B66B 1/34* (2006.01)
  *H04W 4/80* (2018.01)
(58) Field of Classification Search
  USPC .............. 187/247, 380–384, 391, 393, 396
  See application file for complete search history.

(56) References Cited

U.S. PATENT DOCUMENTS

| | | | |
|---|---|---|---|
| 4,989,695 A * | 2/1991 | Kubo | B66B 1/18 |
| | | | 187/247 |
| 5,202,540 A * | 4/1993 | Auer | G05B 9/03 |
| | | | 187/247 |
| 5,271,484 A * | 12/1993 | Bahjat | B66B 1/18 |
| | | | 187/380 |
| 5,272,287 A * | 12/1993 | Meguerdichian | B66B 1/20 |
| | | | 187/247 |
| 5,387,769 A | 2/1995 | Kupersmith et al. | |
| 5,551,532 A | 9/1996 | Kupersmith | |
| 5,689,094 A | 11/1997 | Friedli et al. | |
| 6,341,668 B1 * | 1/2002 | Fayette | B66B 3/00 |
| | | | 187/247 |
| 6,467,583 B1 * | 10/2002 | Koura | H04L 12/403 |
| | | | 187/247 |
| 6,471,011 B1 * | 10/2002 | Ando | B66B 1/34 |
| | | | 187/247 |
| 6,481,532 B1 | 11/2002 | Ando | |
| 6,533,075 B2 * | 3/2003 | Masuda | B66B 1/34 |
| | | | 187/247 |
| 6,601,679 B2 | 8/2003 | Crenella et al. | |
| 6,708,801 B2 * | 3/2004 | Nakai | B66B 1/34 |
| | | | 187/247 |
| 7,134,530 B2 * | 11/2006 | Motoyama | B66B 1/34 |
| | | | 187/247 |
| 7,711,565 B1 * | 5/2010 | Gazdzinski | B66B 3/00 |
| | | | 187/396 |
| 2002/0199120 A1 | 12/2002 | Schmidt | |

FOREIGN PATENT DOCUMENTS

| | | |
|---|---|---|
| EP | 0544543 A2 | 6/1993 |
| JP | H072574 B2 | 1/1995 |
| JP | 2002114459 A | 4/2002 |
| KR | 100259507 B1 | 7/2000 |
| KR | 20040052419 A | 6/2004 |
| KR | 100440428 B1 | 7/2004 |
| WO | 2011083208 A1 | 7/2011 |

OTHER PUBLICATIONS

Chinese Office Action for application CN201280072250.5, dated Aug. 31, 2015, and Chinese Search Report, 7 pages.
European Extended Search Report for application EP 12873526.3, dated Oct. 7, 2015, 5 pages.
Chinese Office Action and Search for application CN 201280072250.5, dated Oct. 8, 2016, 16 pages.
International Search Report for application PCT/US2012/031928, dated Dec. 26, 2012, 5 pages.
Written Opinion for application PCT/US2012/031928, dated Dec. 26, 2012, 4 pages.
European Office Action for application 12873526.3, dated Feb. 22, 2018, 5 pages.

* cited by examiner

ELEVATOR SYSTEM USING DUAL COMMUNICATION CHANNELS

FIELD OF INVENTION

The subject matter disclosed herein relates generally to elevator communication networks and, more particularly, to an elevator communication network using dual communication channels. Car controller communication is provided over a ring network (e.g., RS-422 ring network) and fixture communication is provided over a controller area network (CAN) bus.

DESCRIPTION OF RELATED ART

Typically, an elevator control system for controlling multiple elevator cars will arrange multiple elevator cars in a group. Each elevator car is associated with a car controller that performs car-related signaling and motion functions, while a separate group controller or a distributed controller coordinates the group of car controllers. The car controllers and group controller communicate over a network or bus.

Elevator control systems also include fixtures that communicate with the elevator control system. For example, each hallway may include at least one destination entry fixture such as, for example, a destination entry keypad that can transmit a destination request to the group controller and provide visible and/or audible indication that an elevator car is about to arrive. More advanced fixtures, for example a touch screen, require higher amounts of data and consume higher bandwidth on the network. This use of higher bandwidth by certain fixtures may result in a disruption in communicating control information between one or more car controllers and the group controller. A delay or loss of control information has a higher impact on elevator car operation than a similar delay or loss of fixture information.

BRIEF SUMMARY

According to one aspect of the invention, at least one destination entry fixture coupled to a controller area network (CAN) bus that provides a first communication channel, the at least one destination entry fixture operable to transmit destination information over the CAN bus; a plurality of elevator car controllers each associated with a respective elevator car, the plurality of elevator car controllers coupled to the CAN bus to receive the destination information; the plurality of elevator car controllers coupled to a ring network that provides a second communication channel; and a group controller operable to determine an elevator car to be dispatched in response to receiving the destination information.

According to another aspect a method for control of an elevator control system, comprising: using a first communication channel to transmit destination information from at least one destination entry fixture to a group controller, the first communication channel being provided over a CAN bus; and using a second communication channel to provide communications between the group controller and a plurality of elevator car controllers, the second communication channel being provided over a ring network.

According to another aspect an elevator control system, comprising: at least one destination entry fixture coupled to a first communication channel, the at least one destination entry fixture operable to transmit destination information over the first communication channel; a group controller to determine an elevator car to be dispatched in response to receiving the destination information over the first communication channel; and a second communication channel coupled to the at least one destination entry fixture, the second communication channel providing information to the least one destination entry fixture.

According to another aspect of the invention an elevator control system, comprising: at least one destination entry fixture coupled to a first communication channel, the at least one destination entry fixture operable to transmit destination information over the first communication channel; and a plurality of elevator car controllers each associated with a respective elevator car, the plurality of elevator car controllers coupled to a second communication channel for elevator car control.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawing wherein like elements are numbered alike in the FIGURES.

DETAILED DESCRIPTION

Embodiments of an elevator control system include dual communication channels for transmitting and receiving data. One communication channel is provided over a ring network (e.g. RS-422 ring) and another communication channel is provided over a CAN bus. The elevator control system includes car controllers associated with respective elevator cars that communicate with each other via the RS-422 ring network. Destination entry input fixtures are connected to the CAN bus and communicate bi-directionally over the CAN bus to one or more elevator car controllers. In an embodiment, a wireless network is provided to transmit and receive information from a supervisory computer to wireless transceivers that are coupled to respective elevator car controllers and destination entry input fixtures.

Figure 1:
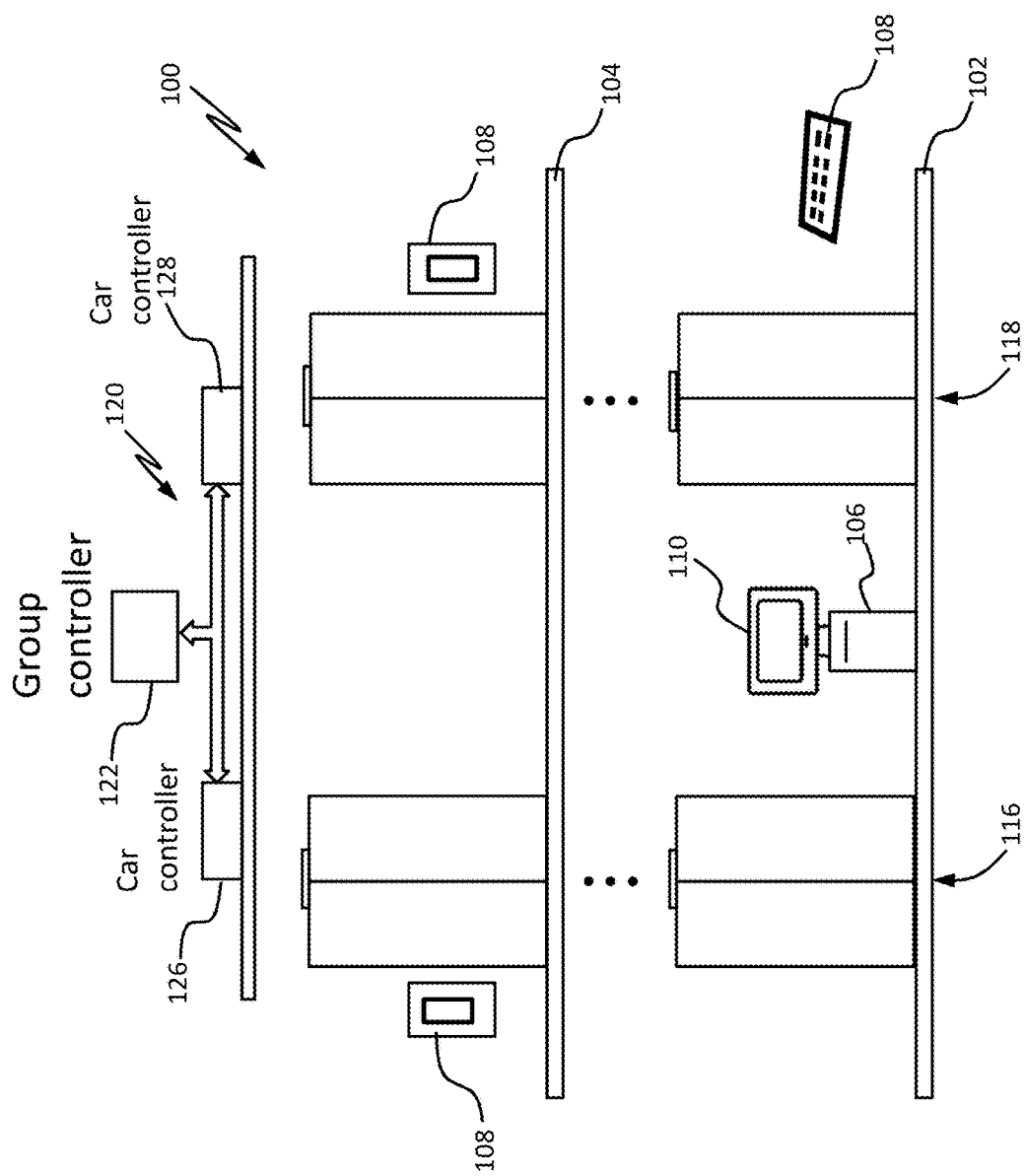
FIG. 1 depicts an elevator control system using dual communication channels in an embodiment of the invention.

Referring now to the drawings, FIG. 1 illustrates an exemplary elevator system 100 including an elevator control network 120 with dual communication channels according to an embodiment of the invention. Elevator system 100 includes, in one embodiment, two elevator hoistways 116 and 118 for moving passengers between a plurality of landings, such as floors 102 and 104. Additional hoistways and/or floors may be provided in other embodiments. In the example shown, elevator hoistways 116, 118 accommodate elevator cars between the lowest floor 102 to a higher floor 104. Each of the hoistways 116, 118 has a corresponding car controller 126, 128. The car controllers 126, 128 perform car related activities and coordinate with a group controller. A group controller 122 performs group-related signaling and dispatching functions as a group between the elevator cars. In an exemplary embodiment, one of the car controllers 126, 128 also provides the group controller functionality, eliminating the need for a separate group controller 122.

The car controllers 126, 128 are configured for communication and communicate with each other via a ring network 202 (FIG. 2), which in exemplary embodiments is an RS-422 ring network. The RS-422 ring network 202 provides a ring topology where control and dispatch data is forwarded around the RS-422 ring network. In some embodiments, nodes on the RS-422 ring network are store and forward devices that typically transmit data in a single direction. It is to be appreciated that the communication between the car controllers 126, 128 described herein may be practiced in a networked environment using logical connections to one or more remote computers having processors. An exemplary car controller 126, 128 may include a general purpose computing device in the form of a computer, including a processing unit, a system memory, and a system bus that couples various system components including the system memory to the processing unit. The system memory may include read only memory (ROM) and random access memory (RAM).

The elevator system 100 includes a plurality of destination entry input fixtures such as, for example, a turnstile device 106, a keypad 108, and a touchscreen 110 for communicating destination information received from a user to the car controllers 126, 128. The destination entry input fixtures 106, 108, 110 are connected over a CAN bus 204 (FIG. 2) for bi-directional communications with car controllers 126, 128. Destination entry input fixtures 106, 108, 110 designate a destination floor. In addition to destination entry fixtures, there can also be other human interface devices such as hall car request buttons and hall indicators (e.g., lantern and/or gong) that can also be part of the overall fixtures for the elevator system.

The CAN bus 204 provides a first communication channel and the RS-422 ring network 202 (FIG. 2) provides a second communication channel. The destination entry input fixtures 106, 108,110 may receive information from car controllers 126, 128 via the CAN bus 204. A group controller 122 provided with car controllers 126 or 128 directs the passenger to a hoistway that will provide the most efficient route to their destination based upon at least the operation conditions of the elevator cars in the hoistways 116, 118.

Figure 2:
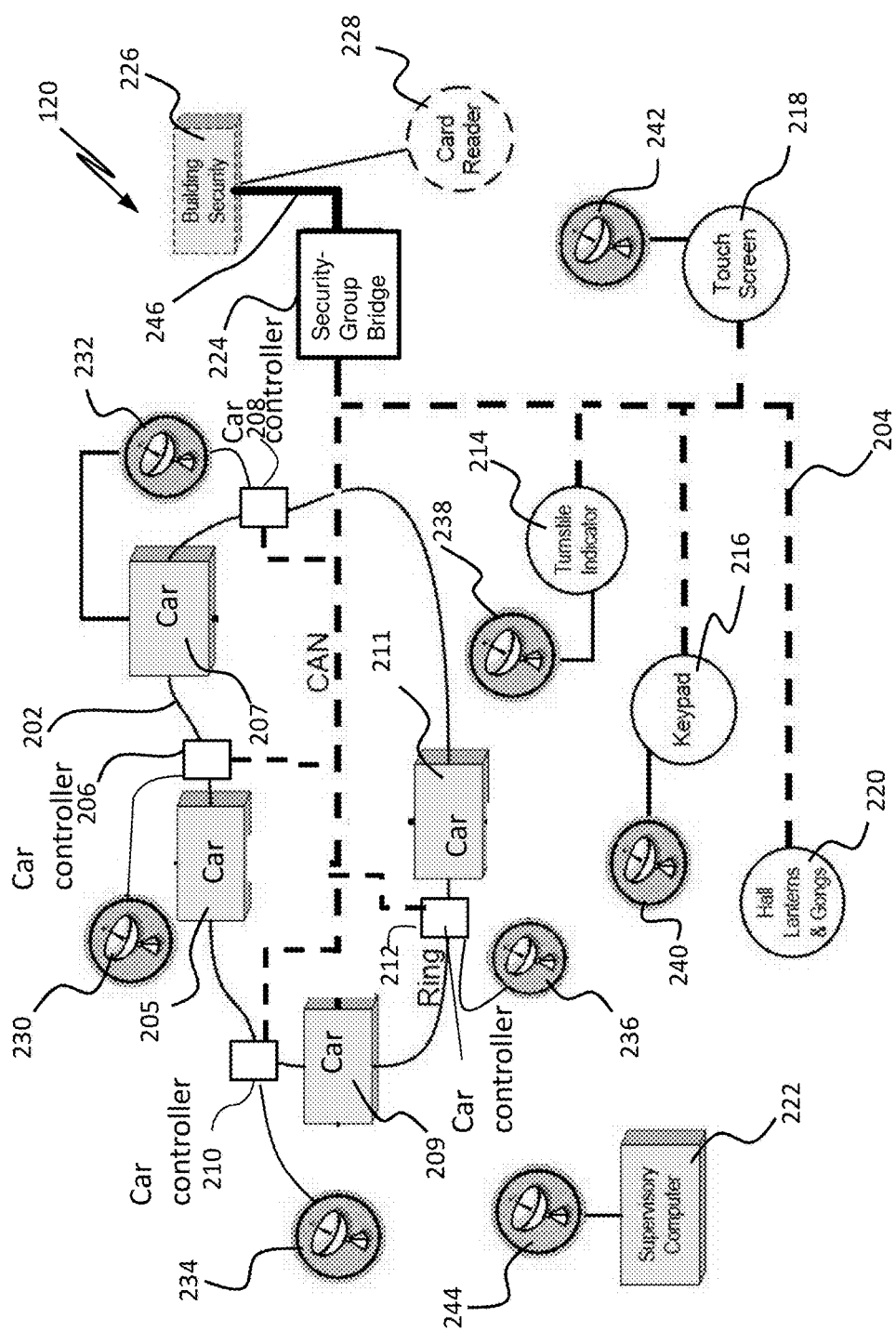
FIG. 2 depicts dual communication channels in the elevator control system of FIG. 1, including a ring network (e.g., RS-422) and a CAN bus, in an embodiment of the invention.

FIG. 2 is a schematic diagram of elevator control network 120 including a communication RS-422 ring network 202 connecting the car controllers 206, 208, 210, 212 and a separate CAN bus 204 connecting hall fixtures 220, and/or destination entry input fixtures 214, 216, 218 to car controllers 206, 208, 210, 212. Hall call buttons may also be connected to CAN bus 204. RS-422 ring network 202 is separate from CAN bus 204, and is typically a lower bandwidth network as compared to CAN bus 204. This configuration prevents the high bandwidth demands or certain fixtures on the CAN bus 204 from interfering with communications between the car controllers 206, 208, 210, 212 on the RS-422 ring network 202.

Control network 120 includes, in an embodiment, car controllers 206, 208, 210, 212 configured for communication with each other via a communication RS-422 ring network 202. Car controller 206 is associated with elevator car 205, car controller 208 is associated with elevator car 207, car controller 210 is associated with elevator car 209, and car controller 212 is associated with elevator car 211. Car controllers 206, 208, 210, 212 communicate with each other over the RS-422 ring network 202 for scheduling elevator cars 205, 207, 209, 211.

Car controllers 206, 208, 210, 212 operate as a group with one car controller providing the functions of a group controller. For ease of understanding and explanation, car controller 206 is the designated group controller in the example shown in FIG. 2. The elevator car controller 206, providing group control functions, processes passenger destination information received from destination entry fixtures 214, 216 and 218 on behalf of the other car controllers 208, 210, 212. As each passenger enters his or her passenger destination information as a call service request, the group controller 206 communicates with car controllers 208, 210, 212 to determine operational properties (e.g., location, door position state, number of passengers, etc.) of elevators when determining the most efficient elevator to be assigned to the call service request. The group controller 206 then schedules one of the elevator cars 205, 207, 209, 211 based in part on the passenger destination information received over CAN bus 204. The passenger is directed to a hoistway, for example hoistway 116, that will most efficiently service his or her call service request based on the previous decision. It is to be appreciated that each of the car controllers 206, 208, 210, 212 receives the same real-time and historical passenger destination information over the CAN bus 204 in case the designated car controller 206 ceases to function. For example, if elevator car 205 is not operational, another car controller 208, 210, 212 is designated as the group controller.

Also shown, elevator control network 120 includes, in one embodiment, a plurality of destination entry input fixtures such as, for example, a turnstile device 214, a keypad 216, and a touchscreen 218 that are connected to the designated car controller, 206, via a CAN bus 204. Destination information is provided by passengers via destination entry input fixtures 214, 216, 218.

Alternatively, a destination entry input fixture may receive destination information from an item or device that is carried by the passenger. For example, the destination entry input fixture may include a card reader, which allows a passenger to submit destination information by passing a security card (which includes stored information about the passenger's destination floor) through the card reader connected to, in one example, a turnstile device 214. The destination entry input fixture may also include an electric transducer or receiver, which receives a signal related to the passenger's destination floor from a transmitter carried by the passenger. The destination entry input fixtures 214, 216, 218 may be located next to the elevators on each floor, which are used by passengers to enter their desired destination floor via numbered keys on, in some embodiments, touch screen 218 or keypad 216. Alternatively, the destination entry input fixtures may be provided on less than all floors, with two-button hall call fixtures provided on the remaining floors. Each of hall lanterns/gongs 220 and destination entry fixtures 214, 216, 218 includes a CAN controller (not shown) that is configured for bi-directional communication over the CAN bus 204.

A building security system 226 is in communication with a security-group bridge 224 over data line 246. The building security system 226 receives passenger credentials through a security card reader 228 and may communicate allowed destination information for that passenger to group controller 206 or destination entry fixtures 214, 216, 218 via security-group bridge 224 and CAN bus 204. The destination entry fixtures and group controller 206 direct the passenger to a hoistway that will provide the most efficient route to their destination. The security-group bridge 224 may also enable other outside networks to access the CAN bus 204.

Further, elevator system 120 includes supervisory computer 222 that provides an outlet for distributing a variety of potential information, including video animation, display screen updates, digital advertising, software updates, etc., to fixtures mounted in elevator cars 205, 207, 209, 211 or destination entry input fixtures 214, 216, 218 as well as receiving information from the fixtures mounted in elevator cars 205, 207, 209, 211 or destination entry input fixtures 214, 216, 218. This information may be transmitted over a wireless network from wireless transceiver 244 located at supervisory computer 222 to wireless transceivers 230, 232, 234, 236, 238, 240, and 242 that are coupled to car controllers 206, 208, 210, 212 and destination entry input fixtures 214, 216, 218. The wireless transceivers 230-242 are powered by the existing infrastructure so no new wiring needs to be installed. Instead of wireless transceivers, an alternative high speed interface (e.g. Ethernet, VDSL) could also be used. This, however, would entail additional wiring in the system. In either embodiment, the wireless network or the alternative high speed interface provide a higher bandwidth than the standard CAN bus.

The technical effects and benefits of exemplary embodiments include a destination entry elevator system using dual communication channels including a ring network (e.g., RS-422 ring network) and a CAN bus. The elevator control system includes car controllers associated with respective elevator cars that communicate via the RS-422 ring network. Destination entry input fixtures are connected to the CAN bus and receive and transmit information over the CAN bus to the car controllers. In an embodiment, a wireless network transmits and receives information between a supervisory computer and wireless transceivers that are coupled to the respective elevator cars and destination entry input fixtures.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as being limited by the foregoing description, but is only limited by the scope of the appended claims.

The invention claimed is:

1. An elevator control system, comprising:
   at least one destination entry fixture coupled to a controller area network (CAN) bus that provides a first communication channel, the at least one destination entry fixture operable to transmit destination information over the CAN bus;
   a plurality of elevator car controllers each associated with a respective elevator car, the plurality of elevator car controllers coupled to the CAN bus to receive the destination information;
   the plurality of elevator car controllers coupled to a ring network that provides a second communication channel;
   a group controller operable to determine an elevator car to be dispatched in response to receiving the destination information;
   a security-group bridge configured to provide communications between an outside network and the CAN bus, wherein security information for one or more passengers is provided over the security-group bridge.

2. The system of claim 1, wherein a first destination entry fixture is operable for bi-directional communication with the group controller over the CAN bus.

3. The system of claim 1, further comprising at least one wireless transceiver coupled to a wireless network, wherein the at least one wireless transceiver is operable to receive information from a supervisory computer in wireless communication with the wireless network, the supervisory computer providing information to at least one of the group controller, an elevator car controller and the at least one destination entry fixture.

4. The system of claim 1, wherein the group controller communicates with the at least one destination entry fixture via the CAN bus.

5. The system of claim 1, wherein ring network comprises an RS-422 ring network.

6. A method for control of an elevator control system, comprising:
   using a first communication channel to transmit destination information from at least one destination entry fixture to a group controller, the first communication channel being provided over a CAN bus;
   using a second communication channel to provide communications between the group controller and a plurality of elevator car controllers, the second communication channel being provided over a ring network;
   coupling a security-group bridge to the first communication channel, wherein security information for one or more passengers is provided over the security-group bridge.

7. The method of claim 6, wherein the second communication channel is provided over a RS-422 ring network.

8. The method of claim 6, further comprising communicating messaging information from the group controller to the at least one destination entry fixture via the first communication channel.

9. The method of claim 6, further comprising coupling a wireless transceiver to a wireless network, wherein the wireless transceiver is operable to receive information from a supervisory computer in wireless communication with the wireless network, the supervisory computer providing information to at least one of the group controller, an elevator car controller and at least one destination entry fixture.

10. An elevator control system, comprising:
    at least one destination entry fixture coupled to a first communication channel, the at least one destination entry fixture operable to transmit destination information over the first communication channel and receive information;
    a group controller to determine an elevator car to be dispatched in response to receiving the destination information over the first communication channel; and
    a second communication channel coupled to the at least one destination entry fixture, the second communication channel providing information to the least one destination entry fixture;
    wherein the second communication channel is implemented over a wireless network.

11. The system of claim 10 wherein:
    the first communication channel is implemented over a controller area network (CAN) bus.

12. An elevator control system, comprising:
    at least one destination entry fixture coupled to a first communication channel, the at least one destination entry fixture operable to transmit destination information over the first communication channel; and a plurality of elevator car controllers each associated with a respective elevator car, the plurality of elevator car controllers coupled to a second communication channel for elevator car control;

a security-group bridge coupled to the first communication channel, wherein security information for one or more passengers is provided over the security-group bridge.

13. The system of claim 12 wherein:

at least one of the first communication channel and the second communication channel is a controller area network (CAN) bus.

14. The system of claim 13 wherein:

the second communication channel is a ring network.

15. The system of claim 14 wherein:

the ring network is an RS-422 ring network.

16. The system of claim 1 wherein the security information comprises allowed destination information for a passenger.

* * * * *